US012609970B2

(12) United States Patent　　　　(10) Patent No.:　US 12,609,970 B2
Bainbridge et al.　　　　　　　　　(45) Date of Patent:　*****Apr. 21, 2026

(54) DYNAMIC RESERVATION PROTOCOL FOR 5G NETWORK SLICING

(71) Applicant: Ciena Corporation, Hanover, MD (US)

(72) Inventors: David Keith Bainbridge, Morgan Hill, CA (US); Raghuraman Ranganathan, Bellaire, TX (US); Lyndon Y. Ong, Sunnyvale, CA (US)

(73) Assignee: Ciena Corporation, Hanover, MD (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/728,059

(22) Filed: Dec. 27, 2019

(65) Prior Publication Data

US 2020/0145297 A1　　May 7, 2020

Related U.S. Application Data

(63) Continuation of application No. 15/991,404, filed on May 29, 2018, now Pat. No. 10,541,877.

(51) Int. Cl.
　　*H04L 12/24*　　　(2006.01)
　　*H04L 12/751*　　　(2013.01)
　　　　　　(Continued)

(52) U.S. Cl.
　　CPC ...... *H04L 65/1063* (2013.01); *H04L 41/0895* (2022.05); *H04L 41/122* (2022.05);
　　　　　　(Continued)

(58) Field of Classification Search
　　CPC ..... H04W 24/02; H04W 28/24; H04W 16/02; H04L 41/5041; H04L 41/044;
　　　　　　(Continued)

(56) References Cited

U.S. PATENT DOCUMENTS 5,175,766 A * 12/1992 Hamilton .............. G07F 7/1016
　　　　　　　　　　　　　　　　705/64
6,175,868 B1 * 1/2001 Lavian ................ H04L 41/0816
　　　　　　　　　　　　　　　　709/238

(Continued)

OTHER PUBLICATIONS

El Hattachi et al., 5G White Paper, Feb. 17 of 2015, Next Generation Mobile Networks Ltd, pp. 1-125. (Year: 2015).*

(Continued)

*Primary Examiner* — Muhammad Raza
(74) *Attorney, Agent, or Firm* — Baratta Law PLLC; Lawrence A. Baratta, Jr.

(57)　　　　　　ABSTRACT

A dynamic registration system includes a slice registration server communicatively coupled to one or more clients, and to one or more Application Programming Interfaces (APIs), wherein each API is communicatively coupled to an associated network of one or more networks, each network having resources including one or more of transport, compute, and storage resources; wherein the slice registration system is configured to receive requests for resources of the one or more of transport, compute, and storage resources in the one or more networks, for a client, exchange request/response messages with the one or more networks for a slice registration of the resources in the one or more networks, cause instantiation of the resources in the one or more networks, based on the request/response messages, and provide an acknowledgment to the client based on the instantiation of the resources.

17 Claims, 6 Drawing Sheets

(51) Int. Cl.

| | |
|---|---|
| *H04L 12/931* | (2013.01) |
| *H04L 29/06* | (2006.01) |
| *H04L 29/12* | (2006.01) |
| *H04L 41/0895* | (2022.01) |
| *H04L 41/122* | (2022.01) |
| *H04L 41/40* | (2022.01) |
| *H04L 45/02* | (2022.01) |
| *H04L 47/70* | (2022.01) |
| *H04L 49/354* | (2022.01) |
| *H04L 61/5014* | (2022.01) |
| *H04L 65/1063* | (2022.01) |
| *H04L 65/1073* | (2022.01) |

(52) U.S. Cl.
CPC .............. *H04L 41/40* (2022.05); *H04L 45/02* (2013.01); *H04L 47/70* (2013.01); *H04L 49/354* (2013.01); *H04L 61/5014* (2022.05); *H04L 65/1073* (2013.01)

(58) Field of Classification Search
CPC ..... H04L 41/0843; H04L 41/12; H04L 45/02; H04L 49/354; H04L 61/2015
See application file for complete search history.

(56) References Cited

U.S. PATENT DOCUMENTS

| | | | | |
|---|---|---|---|---|
| 6,556,574 | B1 * | 4/2003 | Pearce ................. | H04L 12/462 |
| | | | | 370/403 |
| 6,799,204 | B1 * | 9/2004 | Baba ................... | H04L 61/5084 |
| | | | | 709/221 |
| 6,985,944 | B2 * | 1/2006 | Aggarwal ............... | H04L 43/00 |
| | | | | 709/224 |
| 7,200,678 | B1 * | 4/2007 | Bettadahalli ........ | H04L 61/5014 |
| | | | | 709/203 |
| 7,246,159 | B2 * | 7/2007 | Aggarwal ............. | H04L 41/069 |
| | | | | 714/E11.193 |
| 7,474,660 | B1 * | 1/2009 | Pearce ................... | H04L 45/54 |
| | | | | 370/409 |
| 7,779,093 | B1 * | 8/2010 | Zhang ................... | H04L 61/59 |
| | | | | 709/221 |
| 8,086,713 | B2 * | 12/2011 | Gandhewar ......... | H04L 61/5014 |
| | | | | 370/254 |
| 8,112,545 | B1 * | 2/2012 | Ong ................... | H04L 61/2514 |
| | | | | 709/202 |
| 8,456,984 | B2 * | 6/2013 | Ranganathan .......... | H04L 49/70 |
| | | | | 370/254 |
| 8,495,224 | B2 * | 7/2013 | Siegmund ............... | H04L 41/00 |
| | | | | 709/227 |
| 8,806,043 | B1 * | 8/2014 | Duraisamy ............. | H04L 69/40 |
| | | | | 709/227 |
| 9,026,625 | B2 * | 5/2015 | Christopher ............ | H04L 61/10 |
| | | | | 709/224 |
| 10,070,344 | B1 * | 9/2018 | Dowlatkhah ......... | H04W 28/16 |
| 2004/0042398 | A1 * | 3/2004 | Peleg ...................... | H04L 47/83 |
| | | | | 370/235 |
| 2005/0004804 | A1 * | 1/2005 | English ................ | G06Q 10/025 |
| | | | | 705/26.4 |
| 2005/0114341 | A1 * | 5/2005 | Droms ................ | H04L 61/5053 |
| 2005/0114515 | A1 * | 5/2005 | Droms ............... | H04L 61/5053 |
| | | | | 709/227 |
| 2005/0152284 | A1 * | 7/2005 | Kotha ................. | H04L 12/4641 |
| | | | | 370/254 |
| 2005/0270982 | A1 * | 12/2005 | McBeath ................ | H04L 1/205 |
| | | | | 370/252 |
| 2006/0090069 | A1 * | 4/2006 | Burokas ................. | H04L 12/18 |
| | | | | 713/163 |
| 2006/0246906 | A1 * | 11/2006 | Vaittinen ............... | H04W 36/14 |
| | | | | 455/442 |
| 2007/0201383 | A1 * | 8/2007 | Ong ........................ | H04L 41/12 |
| | | | | 370/254 |
| 2007/0201676 | A1 * | 8/2007 | Gillis .................. | H04M 3/5175 |
| | | | | 379/265.01 |

| | | | | |
|---|---|---|---|---|
| 2008/0056264 | A1 * | 3/2008 | Ong .................... | H04L 63/0272 |
| | | | | 370/392 |
| 2008/0082649 | A1 * | 4/2008 | Gazier ................... | H04L 67/63 |
| | | | | 709/223 |
| 2008/0095176 | A1 * | 4/2008 | Ong ........................ | H04L 45/02 |
| | | | | 370/400 |
| 2008/0232372 | A1 * | 9/2008 | Ong ........................ | H04L 45/04 |
| | | | | 370/392 |
| 2008/0247393 | A1 * | 10/2008 | Ong ........................ | H04L 45/02 |
| | | | | 370/392 |
| 2009/0006635 | A1 * | 1/2009 | Siegmund ............. | H04L 61/103 |
| | | | | 709/228 |
| 2009/0164555 | A1 * | 6/2009 | Bezanson ............... | H04L 67/34 |
| | | | | 709/203 |
| 2010/0191813 | A1 * | 7/2010 | Gandhewar ......... | H04L 61/5014 |
| | | | | 709/206 |
| 2010/0238791 | A1 * | 9/2010 | Duncan ............... | H04L 43/0811 |
| | | | | 370/216 |
| 2011/0282998 | A1 * | 11/2011 | Johnsson ............ | H04L 61/5061 |
| | | | | 709/226 |
| 2012/0188906 | A1 * | 7/2012 | Ong ........................ | H04L 45/42 |
| | | | | 370/254 |
| 2012/0250585 | A1 * | 10/2012 | Seetharaman ...... | H04L 65/1104 |
| | | | | 370/259 |
| 2013/0071116 | A1 * | 3/2013 | Ong ........................ | H04L 45/04 |
| | | | | 398/45 |
| 2013/0100817 | A1 * | 4/2013 | Oltman .................. | H04L 45/42 |
| | | | | 370/252 |
| 2013/0152215 | A1 * | 6/2013 | Khosravy .............. | G06Q 50/10 |
| | | | | 726/28 |
| 2014/0040440 | A1 * | 2/2014 | Christopher ............ | H04L 61/00 |
| | | | | 709/220 |
| 2014/0098710 | A1 * | 4/2014 | Ong ................... | H04L 65/1069 |
| | | | | 370/255 |
| 2014/0119239 | A1 * | 5/2014 | Hu ........................ | H04L 12/413 |
| | | | | 370/256 |
| 2015/0058968 | A1 * | 2/2015 | Wang .................. | H04L 63/0281 |
| | | | | 726/12 |
| 2015/0142871 | A1 * | 5/2015 | Tofighbakhsh ......... | H04W 4/60 |
| | | | | 709/203 |
| 2015/0281274 | A1 * | 10/2015 | Masurekar .......... | H04L 63/1466 |
| | | | | 726/22 |
| 2015/0381428 | A1 * | 12/2015 | Ong .................... | H04L 49/254 |
| | | | | 709/223 |
| 2016/0270129 | A1 * | 9/2016 | Wang .................. | H04W 48/14 |
| 2016/0352653 | A1 * | 12/2016 | Ranganathan ........ | H04L 41/122 |
| 2016/0352924 | A1 * | 12/2016 | Senarath ............... | H04M 15/66 |
| 2016/0380886 | A1 * | 12/2016 | Blair ........................ | H04L 45/50 |
| | | | | 370/254 |
| 2016/0381718 | A1 * | 12/2016 | Ahuja ................... | H04W 76/10 |
| | | | | 370/338 |
| 2017/0141973 | A1 * | 5/2017 | Vrzic .................... | H04W 16/02 |
| 2017/0163607 | A1 * | 6/2017 | Skuratovich ........ | H04L 65/1045 |
| 2017/0163693 | A1 * | 6/2017 | Skuratovich ............ | H04L 69/28 |
| 2017/0163694 | A1 * | 6/2017 | Skuratovich ........ | H04L 67/5651 |
| 2017/0171895 | A1 * | 6/2017 | Kandagadla .......... | H04W 24/10 |
| 2017/0206115 | A1 * | 7/2017 | Shimojou ............ | G06F 9/5077 |
| 2018/0041904 | A1 * | 2/2018 | Shimojou ............. | H04W 88/18 |
| 2018/0123961 | A1 * | 5/2018 | Farmanbar .......... | H04L 41/0896 |
| 2018/0139109 | A1 * | 5/2018 | Zuerner ................. | H04L 41/40 |
| 2018/0317133 | A1 * | 11/2018 | Sciancalepore ....... | H04W 24/02 |
| 2018/0317134 | A1 * | 11/2018 | Leroux ............... | H04W 28/26 |
| 2019/0075467 | A1 * | 3/2019 | Mouquet .............. | H04W 48/18 |
| 2019/0104551 | A1 * | 4/2019 | Deenoo ............. | H04W 72/0453 |
| 2019/0174498 | A1 * | 6/2019 | Samdanis ............ | H04W 16/10 |
| 2019/0259092 | A1 * | 8/2019 | Oktay ............... | H04W 72/0453 |

OTHER PUBLICATIONS

J. Ordonez-Lucena et al., Network Slicing for 5G with SDN/NFV: Concepts, Architectures and Challenges, IEEE Communications Magazine, Citation information: DOI 10.1109/MCOM.2017. 1600935, © 2017 IEEE, pp. 1-19.
C. Bouras et al., SDN & NFV in 5G: Advancements and Challenges, pp. 2-5.

(56) References Cited

OTHER PUBLICATIONS

GSMA, An Introduction to Network Slicing, Copyright © 2017 GSM Association, pp. 1-20.
ONF—Open Network Foundation, OpenFlow Switch Specification, Version 1.5.1 (Protocol version 0x06), Mar. 26, 2015, ONF TS-025, Copyright © 2015; Open Networking Foundation, pp. 1-283.
R. Droms, Network Working Group, Dynamic Host Configuration Protocol, Category: Standards Track, Mar. 1997, pp. 1-45.

* cited by examiner

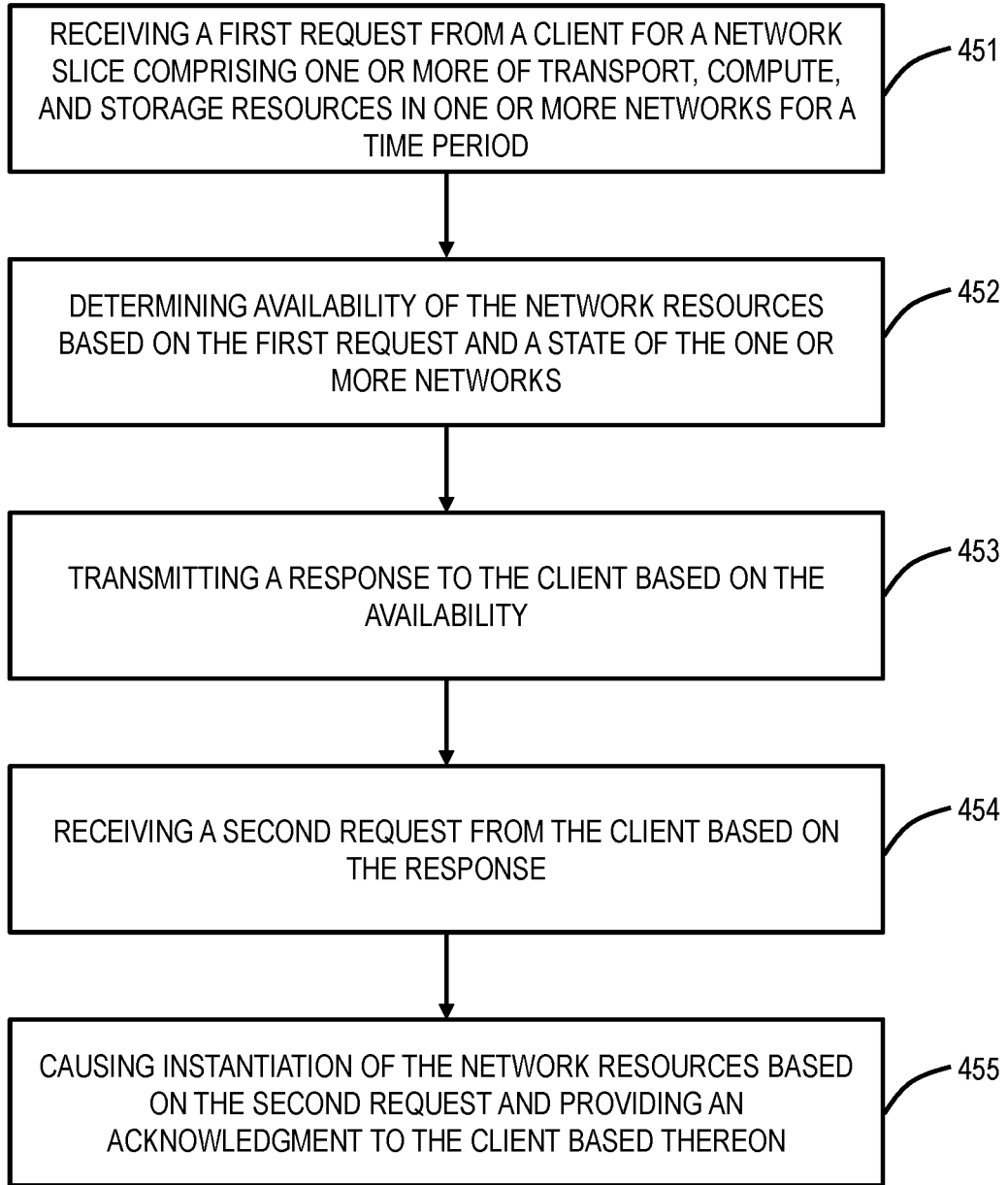

RECEIVING A FIRST REQUEST FROM A CLIENT FOR A NETWORK SLICE COMPRISING ONE OR MORE OF TRANSPORT, COMPUTE, AND STORAGE RESOURCES IN ONE OR MORE NETWORKS FOR A TIME PERIOD — 451

DETERMINING AVAILABILITY OF THE NETWORK RESOURCES BASED ON THE FIRST REQUEST AND A STATE OF THE ONE OR MORE NETWORKS — 452

TRANSMITTING A RESPONSE TO THE CLIENT BASED ON THE AVAILABILITY — 453

RECEIVING A SECOND REQUEST FROM THE CLIENT BASED ON THE RESPONSE — 454

CAUSING INSTANTIATION OF THE NETWORK RESOURCES BASED ON THE SECOND REQUEST AND PROVIDING AN ACKNOWLEDGMENT TO THE CLIENT BASED THEREON — 455

FIG. 6

DYNAMIC RESERVATION PROTOCOL FOR 5G NETWORK SLICING

CROSS-REFERENCE TO RELATED APPLICATION(S)

The present disclosure is a continuation of U.S. patent application Ser. No. 15/991,404, filed May 29, 2018, and entitled "Dynamic reservation protocol for 5G network slicing," the contents of which are incorporated herein by reference.

FIELD OF THE DISCLOSURE

The present disclosure generally relates to 5G networking. More particularly, the present disclosure relates to systems and methods for a dynamic reservation protocol for 5G network slicing.

BACKGROUND OF THE DISCLOSURE 5G is more than a set of standards for next-generation wireless networking. Rather, 5G includes aspects of wireless and wireline network integration. One key aspect of 5G is network slicing which allows operators to split a single physical network into multiple virtual networks. Thus, operators deploy one single physical infrastructure and partition networks virtually using network slicing. Network slicing technology enables operators to provide networks on an as-a-service basis, which enhances operational efficiency while reducing time-to-market for new services. A network slice could span across multiple parts of the network (e.g., terminal, access network, core network, and transport network) and could also be deployed across multiple operators. A network slice includes dedicated and/or shared resources, e.g., in terms of processing power, storage, and bandwidth and has isolation from the other network slices. Slice types could be defined from a functional, operational, or behavioral perspective.

With the concept of network slicing, there is a requirement to address slice requests that address the problem using a vendor-neutral protocol, address the issue of time-boxed slice reservations, or allow a multiplicity of reservation servers to enable greater scalability and performance. The conventional approaches use calendaring based future reservations and/or vendor specific Application Programming Interfaces (APIs) that clients would have to (potentially) license. Disadvantageously, these conventional approaches require vendor lock-in for a client API and back-end server, do not address slice time boxing and expiration, increase operational complexity, depend on pre-defined network slices, etc.

BRIEF SUMMARY OF THE DISCLOSURE

In an embodiment, a method for dynamic reservation of network slices includes, in a slice reservation server communicatively coupled to a client and one or more networks configured to provide transport, compute, and storage resources, receiving a first request from the client for a network slice including one or more of transport, compute, and storage resources in the one or more networks for a time period; determining availability of the resources based on the first request and a state of the one or more networks; transmitting a response to the client based on the availability; receiving a second request from the client based on the response; and causing instantiation of the resources based on the second request and providing an acknowledgment to the client based thereon. The method can further include receiving a release from the client for the network slice and causing release of the resources based thereon. The method can further include maintaining network connectivity to the client subsequent to the release for future requests. The method can further include, responsive to a failure to cause the instantiation, transmitting a negative acknowledgment to the client. The method can further include receiving the first request again based on the negative acknowledgment. The method can further include receiving a third request while the network resources are instantiated to extend the time period; and extending the instantiation of the resources based thereon. The first request can include a discover request with a set of name-value pairs requesting one or more of specific resources, an application catalog of resources, attributes for the specific resources, prioritization, and the time period. The second request can include a mirror of the response. The instantiation of the network resources can be via Software Defined Networking (SDN). The time period can be for a future time and the causing instantiation is scheduled for the future time.

In another embodiment, a slice registration server configured to implement dynamic reservation of network slices includes a network interface communicatively coupled to a client and to one or more networks configured to provide transport, compute, and storage resources; a processor communicatively coupled to the network interface; and memory storing instructions that, when executed, cause the processor to receive a first request from the client for a network slice including one or more of transport, compute, and storage resources in the one or more networks for a time period, determine availability of the resources based on the first request and a state of the one or more networks, transmit a response to the client based on the availability, receive a second request from the client based on the response, and cause instantiation of the resources in the one or more networks and provide an acknowledgment to the client based thereon. The memory storing instructions that, when executed, can further cause the processor to receive a release from the client for the network slice and causing release of the resources based thereon. The memory storing instructions that, when executed, can further cause the processor to maintain network connectivity to the client subsequent to the release for future requests. The memory storing instructions that, when executed, can further cause the processor to, responsive to a failure to cause the instantiation, transmit a negative acknowledgment to the client; and receive the first request again based on the negative acknowledgment. The memory storing instructions that, when executed, can further cause the processor to receive a third request while the network resources are instantiated to extend the time period; and extend the instantiation of the resources based thereon. The first request can include a discover request with a set of name-value pairs requesting one or more of specific resources, an application catalog of resources, attributes for the specific resources, prioritization, and the time period. The second request can include a mirror of the response. The instantiation of the network resources can be via Software Defined Networking (SDN). The time period can be for a future time and the causing instantiation is scheduled for the future time.

In a further embodiment, a non-transitory computer-readable medium includes instructions that, when executed, cause a slice reservation server communicatively coupled to a client and one or more networks configured to provide transport, compute, and storage resources to perform the steps of receiving a first request from the client for a network slice including one or more of transport, compute, and storage resources in the one or more networks for a time period; determining availability of the resources based on the first request and a state of the one or more networks; transmitting a response to the client based on the availability; receiving a second request from the client based on the response; and causing instantiation of the resources and providing an acknowledgment to the client based thereon.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 6 is a flowchart of a process, implemented by a slice registration server, for dynamic reservation of network slices.

DETAILED DESCRIPTION OF THE DISCLOSURE

The present disclosure relates to systems and methods for a dynamic reservation protocol for 5G network slicing. The systems and methods provide a mechanism to dynamically request and receive time-boxed slice reservations. In an embodiment, the systems and methods leverage the existing Dynamic Host Configuration Protocol (DHCP) protocol which has a tested request/response paradigm. The systems and methods can extend DHCP to perform dynamic reservation of network slices. An additional advantage of the DHCP model is that it supports an architecture with multiple reservation servers operating on either dedicated or shared resources and potentially offering high availability of the reservation function. For example, an implementation could use the DHCP protocol itself, the options field(s) allowing for various extensions to be implemented. For example, an extension can be implemented with Option 43, and a Slice Class could be used with DHCP Option 60. This can be for the specific use of this protocol for slice reservation process between an 'agent' running in user/application and in an orchestration server. However, such extension information may be ignored by an agent in user/application and/or orchestration server if not supporting the required slice reservation state machine with the ability to parse the information in the options field. Some of the information could be for attributes of standard slice service models, e.g., Metro Ethernet Forum (MEF Forum) Services, and, hence, vendor neutral.

The dynamic reservation protocol can be implemented via protocol agents executed as microservices or Virtual Network Functions (VNFs) and hosted in a software container environment or Virtual Machine (VM). Alternatively, the dynamic reservation protocol can be implemented on native clients such as within a Linux process or on a networked device (e.g., mobile phone, Internet of Things (IoT) device, etc.). With dynamic services, new endpoints, such as in IoT, can be added to existing endpoints, and can be removed from a given application slice. The systems and methods allow for combining the Boot process for a new endpoint (i.e., authenticate, get an endpoint identifier, download configuration file, install per script) and subsequent slice access/ reservation process when authorized to do so during the lifecycle of that endpoint.

Example Network

Figure 1:
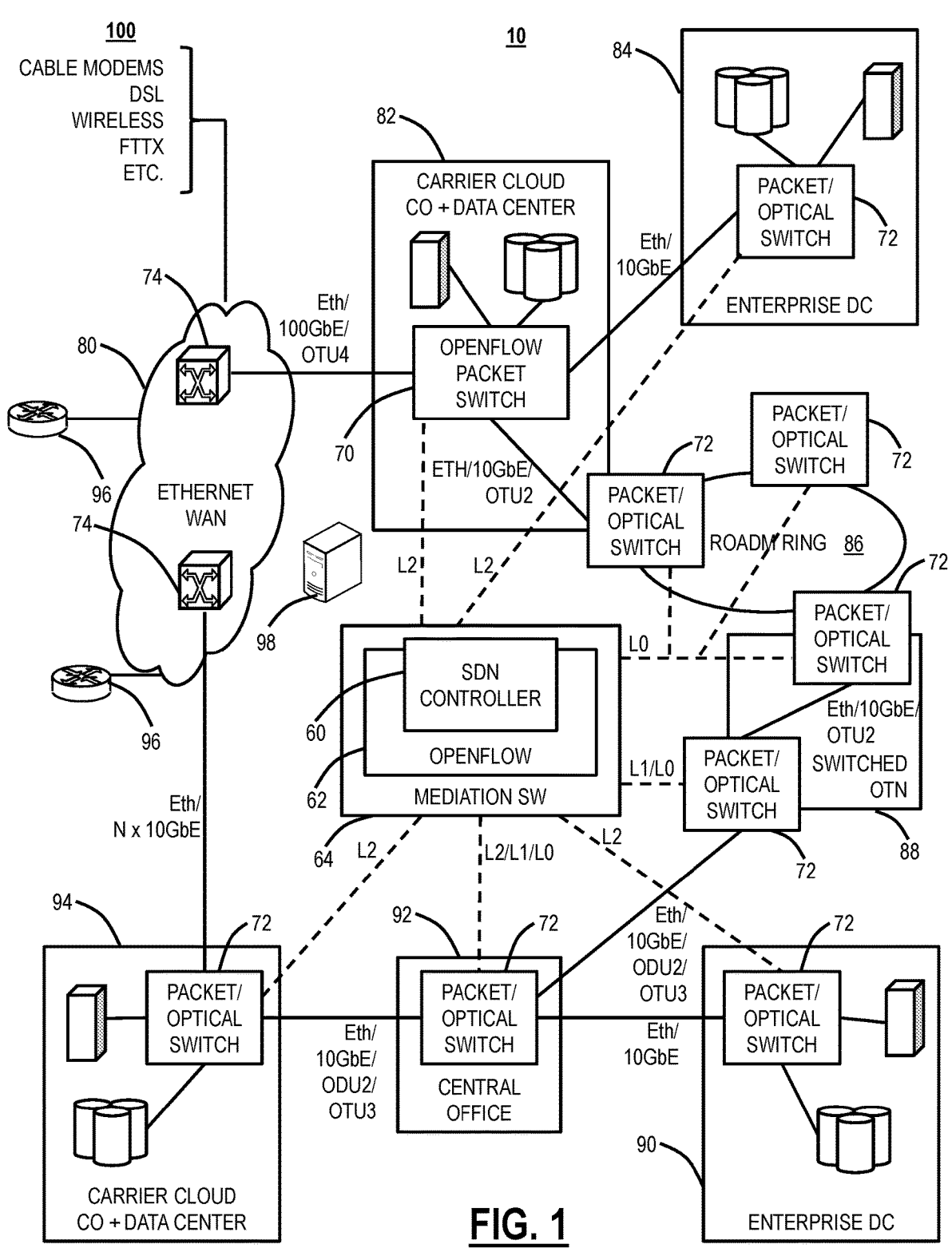
FIG. 1 is a network diagram of a network for describing the systems and methods.

FIG. 1 is a network diagram of a network 10 for describing the systems and methods. Those of ordinary skill in the art will recognize that various network configurations are contemplated with the proposed systems and methods, and the network 10 is merely presented for illustration. The network 10 can be a Software Defined Network (SDN) network, which includes an SDN controller 60 with the ability to (logically) centrally program provisioning of forwarding in the network 10 in order for more flexible and precise control over network resources to support new services. Application Programmable Interfaces (APIs) provide programmatic communication between the SDN controller 60 and either (i) specific applications or (ii) programmable network devices such as communication over Google Remote Procedure Calls (GRPC), Representational State Transfer (REST), Network Configuration Protocol (NET-CONF), Transaction Language-1 (TL-1), Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision a forwarding table at each switch along a connection path in order to instantiate the forwarding behavior needed for the connection. Note, the SDN controller 60 can also control Virtual Network Function (VNFs), non-switch network devices, and the like.

OpenFlow is described, for example, in the OpenFlow Switch Speciation, Version 1.1.0 (February 2011)—Version 1.5.0 (December 2014), the contents of which are incorporated by reference herein. While OpenFlow describes one version of an SDN interface, other SDN protocols besides OpenFlow (such as Nedlow, REST, P4, etc.) are also contemplated with the systems and methods described herein. Of course, other types of networks are also contemplated besides SDN.

Again, for illustration purposes, the network 10 includes an OpenFlow-controlled packet switch 70, various packet/ optical switches 72, and packet switches 74 with the switches 70, 72 each communicatively coupled to the SDN controller 60 via the OpenFlow interface 62 and optionally via the mediation software 64 at any of Layers 0-3 (for example L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can also be traditional Ethernet switches that are not controlled by the SDN controller 60. The network 10 can include various access technologies 100, such as, without limitation, cable modems, digital subscriber loop (DSL), wireless, fiber-to-the-X (e.g., home, premises, curb, etc.), and the like. In an embodiment of the proposed solution, the network 10 is a multi-vendor (i.e., different vendors for the various components) and multi-layer network (i.e., Layers L0-L3).

Figure 2:
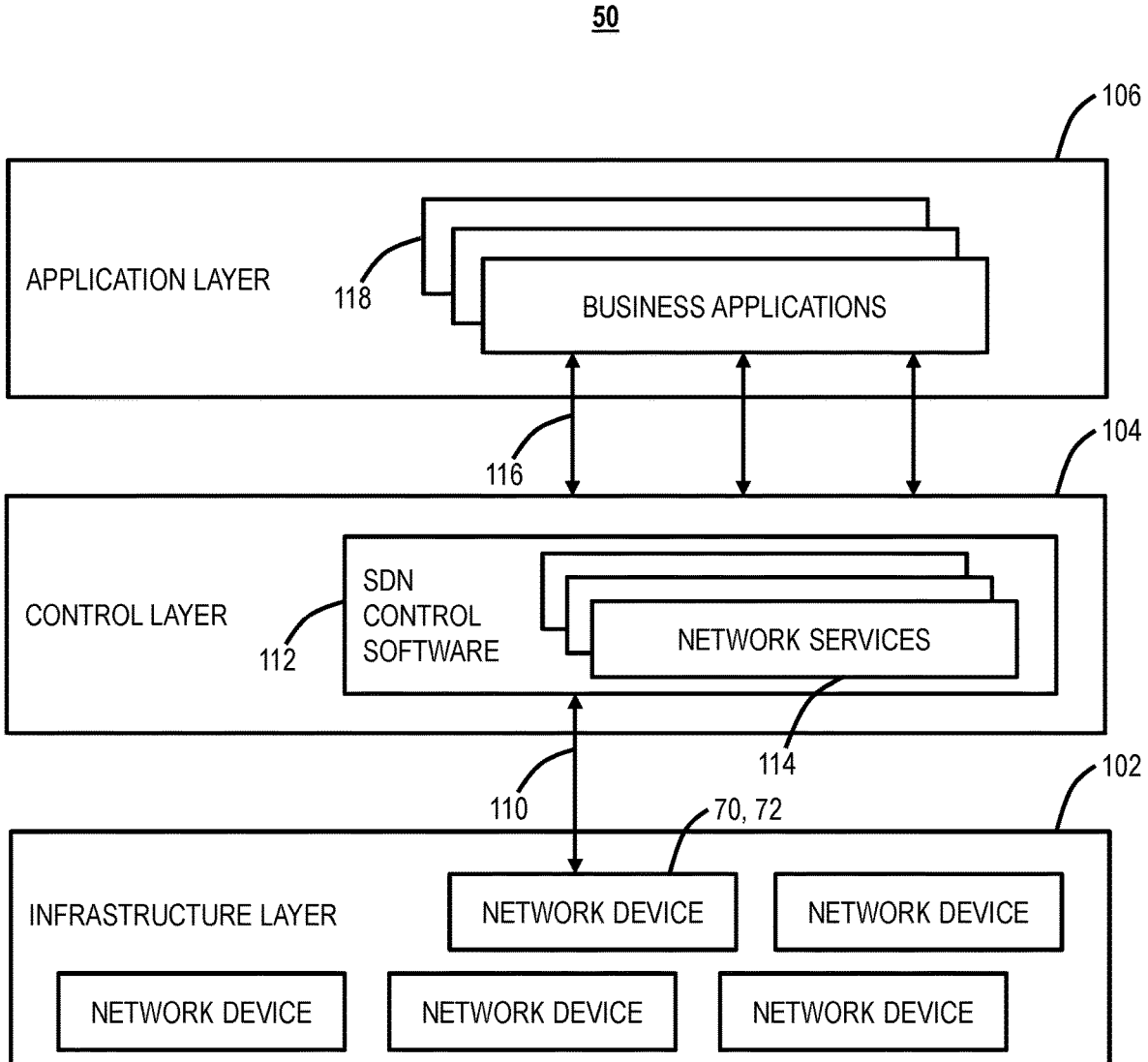
FIG. 2 is a block diagram of functional components of a Software Defined Networking (SDN) environment.
Figure 3:
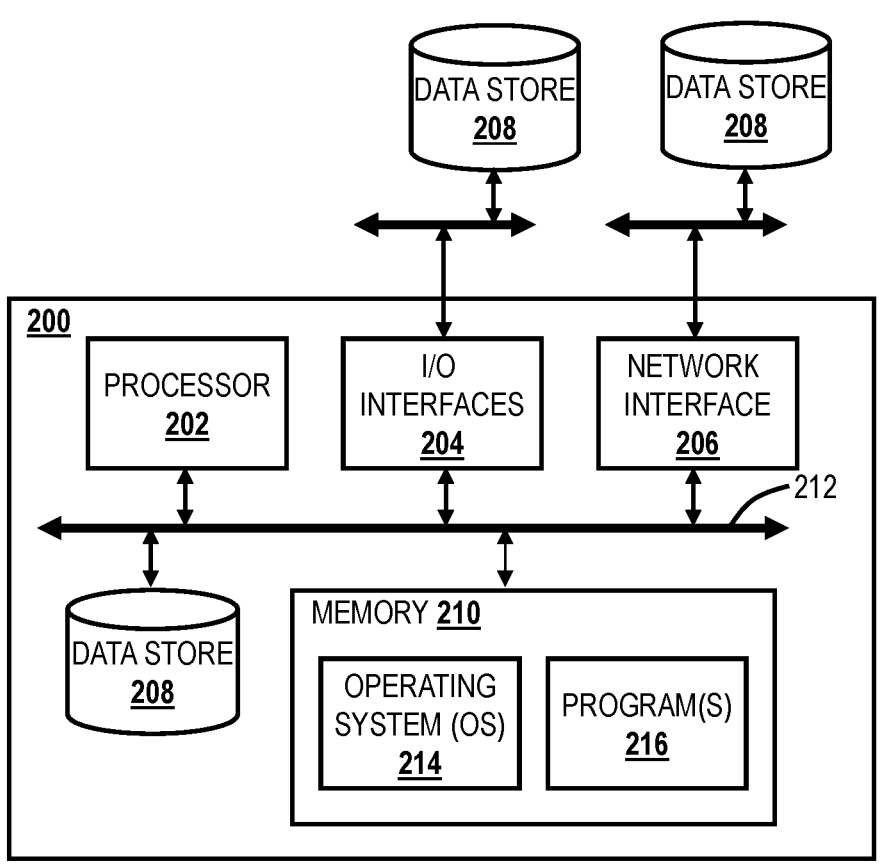
FIG. 3 is a block diagram of a server which may be used to realize the SDN controller, the business applications, and/or other systems.

FIG. 2 is a block diagram of functional components of an SDN environment 50. The SDN environment 50 includes a programmable infrastructure layer 102, a control layer 104, and an application layer 106. The SDN environment 50 layers 104, 106 can be implemented on one or more servers, such as illustrated in FIG. 3, and the layers 104, 106 can be through functional components implemented in software executed on the server. The programmable infrastructure layer 102 includes network devices such as the switches 70, 72 and the like. The programmable infrastructure layer 102 is communicatively coupled to the control layer 104 via a control plane interface 110 such as OpenFlow, for example. The control layer 104 facilitates communication between the application layer 106 and the network devices 70, 72 located in the programmable infrastructure layer 102. The control layer 104 includes SDN control software 112 with a plurality of network services 114. The control layer 104 provides SDN functionality to manage network services through abstraction of lower level functionality. The application layer 106 communicates with the control layer 104 through various Application Programming Interfaces (APIs) 116. The application layer 106 provides operator connectivity to the SDN such as software modules and/or functions responsible for creating the desired path and flow connections on the physical network through various business applications 118. In an embodiment, the systems and methods described herein can be implemented as one of the business applications 118 on the SDN controller 60 and/or on a separate server 200.

Server

FIG. 3 is a block diagram of a server 200 which may be used to realize the SDN controller 60, the business applications 118, and/or other systems. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Network Slices

Figure 4:
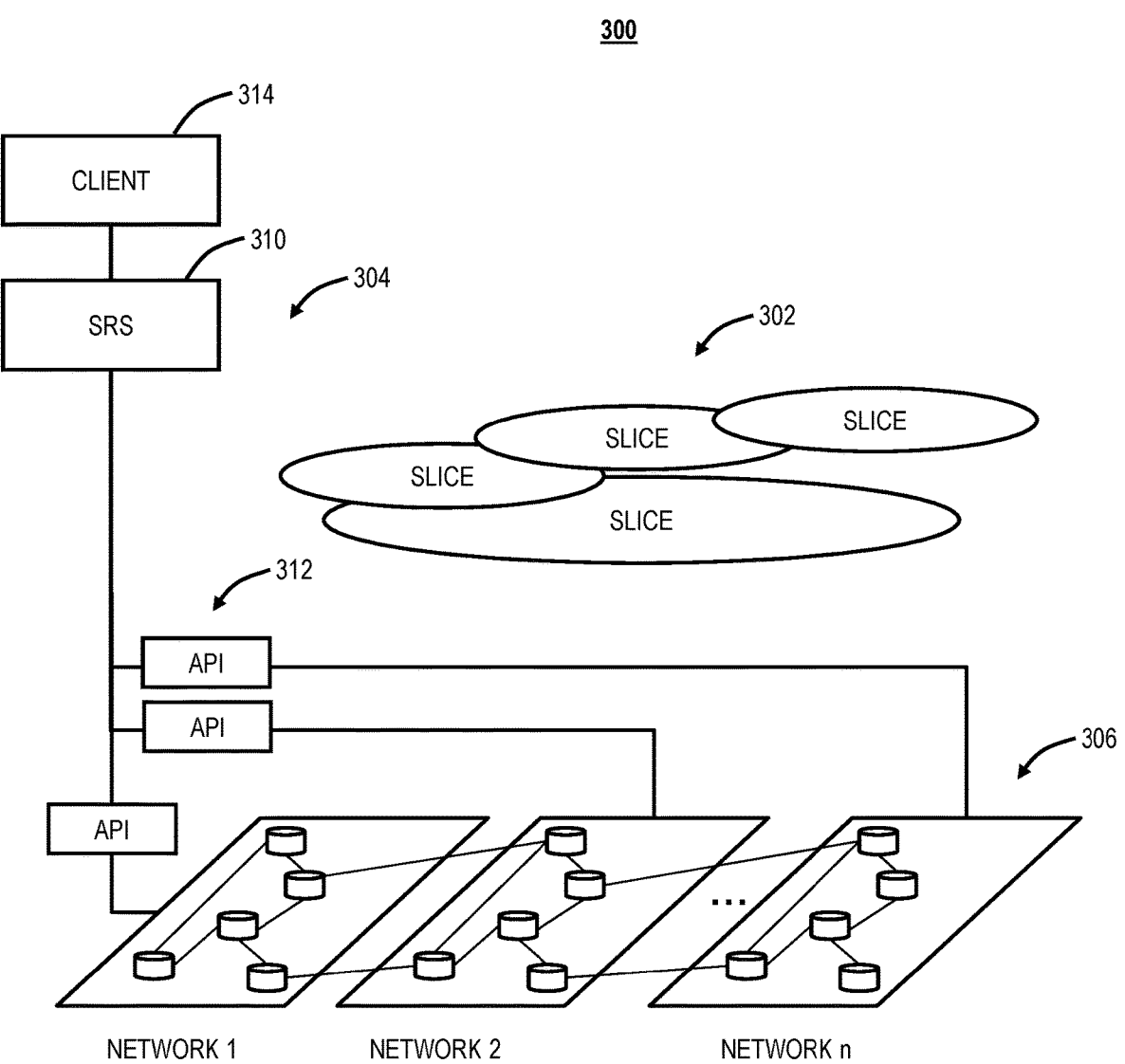
FIG. 4 is a network diagram of a network illustrating network slices and a dynamic reservation system.

FIG. 4 is a network diagram of a network 300 illustrating network slices 302 and a dynamic reservation system 304. The network 300 includes one or more networks 306 which can be physical networks, virtual networks, and combinations thereof supporting network, compute, and/or storage resources. For illustration purposes, FIG. 4 includes different networks 1, 2, . . . , n. The network slices 302 are services provisioned on the network, compute, and/or storage resources across the networks 306. Again, the network slices 302 can span across multiple parts of the network 300 (e.g., terminal, access network, core network, and transport network) and could also be deployed across multiple operators/ service providers, i.e., the networks 306. The network slices 302 can include dedicated and/or shared resources, e.g., in terms of processing power, storage, and bandwidth and has isolation from the other network slices. Slice types could be defined from a functional, operational, or behavioral perspective.

The dynamic reservation system 304 can include a slice registration server (SRS) 310 and Application Programming Interfaces (APIs) 312. There can be multiple slice registration servers 310, including one or more for each of the networks 306 (i.e., for each operator/service provider). Also, there can be a master slice registration server 310. A client 314 may require the use of a set of network/compute/storage resources that are offered as one or more application slices using a shared pool of one or more resource slices for dedicated use during a given time interval. Such use would involve a slice reservation model that can be either on-demand, i.e., when needed, or scheduled, i.e., calendaring, which is provided via the dynamic reservation system 304. As described herein, the client 314 can include a user device (phone, laptop, tablet, etc.), a network operator, an organization, an IoT device, as well as groups of devices or any other device which could consume network (transport)/ compute/storage resources.

One approach is to use the API 312 between the client 314 and the Service Provider(s) (the networks 306) of the slice(s) 302. The API 312 can also be implemented in the form of an in-band protocol to exchange request/response messages as part of the user/application registration and slice reservation process. This also allows for a user/application attached to a different domain than that of the Service Provider (SP), e.g., a virtual network operator, of the slice and, thus, enable tunneling of the request via a data plane path. Note, while the dynamic reservation system 304 is described between a client 314 and Service Provider, those skilled in the art will appreciate the dynamic reservation system 304 and associated processes contemplate operation between Service Providers. For example, one service provider can use the dynamic reservation system 304 to reserve slice components in other operator's network(s). That is, the client can be a user, a group of users, or a service provider.

For performance and scalability reasons it may be necessary to have multiple entities that receive and process slice reservation requests, including, for example, entities that access and control dedicated partitions of network resources as well as entities that share control over the same set of network resources, and may support high availability for the slice reservation function. Various approaches are contemplated for scalability and availability.

Dynamic Reservation Process

Figure 5:
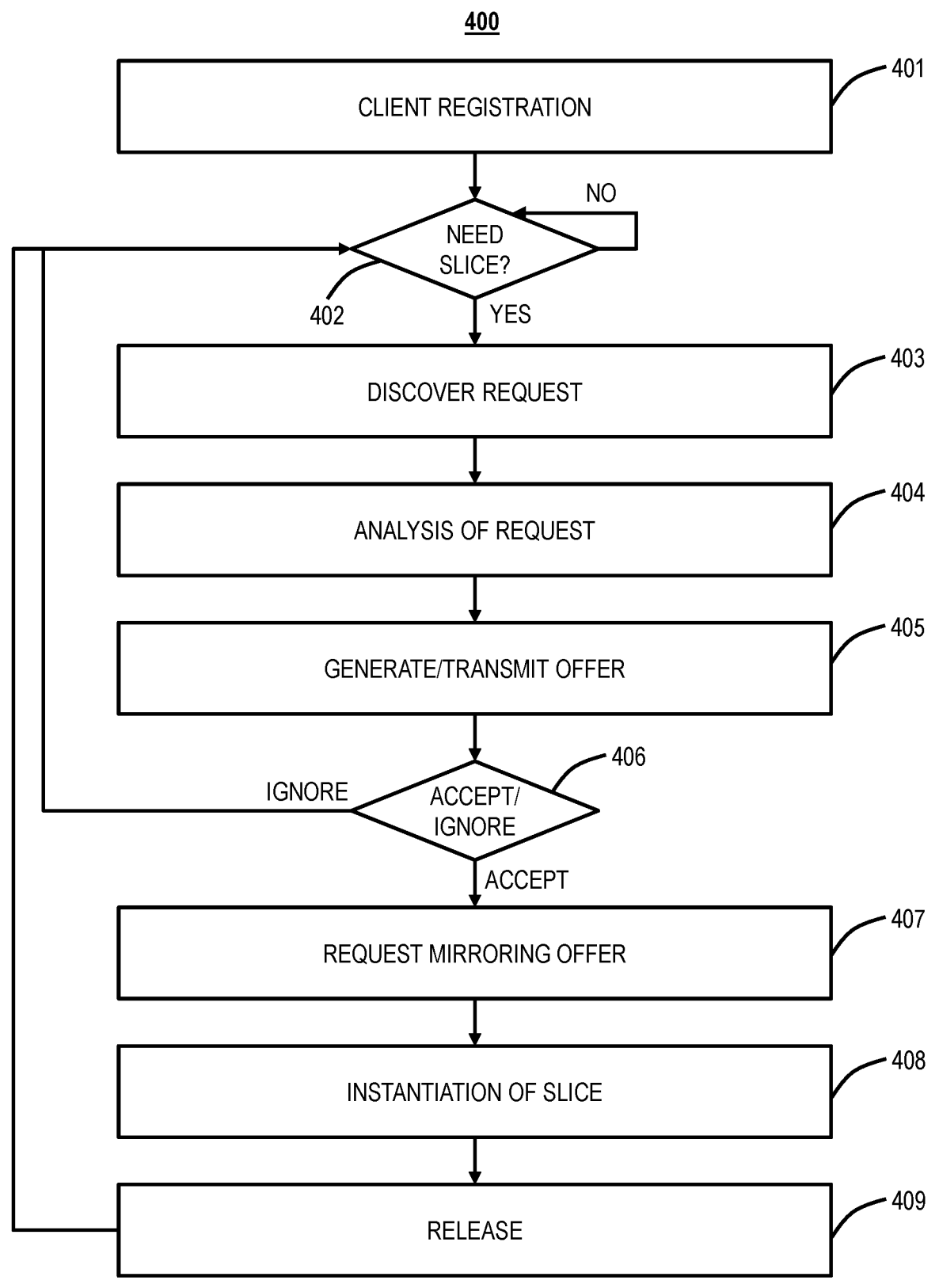
FIG. 5 is a flowchart of a dynamic reservation process which can be implemented by the dynamic reservation system.

FIG. 5 is a flowchart of a dynamic reservation process 400 which can be implemented by the dynamic reservation system 304. Specifically, the dynamic reservation process 400 can be implemented between the slice registration server 310, the APIs 312, and the client 314. The dynamic reservation process 400 includes client registration (step 401), such as via x.509/IEEE 802.1x authentication/authorization. The dynamic reservation process 400 can follow the DHCP DISCOVER, OFFER, REQUEST, ACK protocol sequence. DHCP is a technique for Internet Protocol (IP) address allocation/deallocation. The DHCP approach reallocates an idle resource (IP address, and thus, network access) when DHCP Client attaches (new)/re-attaches (old) to the network, this approach provides dynamically allocating access to an idle slice to users based on new requests.

When a client, i.e., a subscriber of one or more application slices per business policies—needs a specific application slice with specific characteristics (step 402), it generates a slice DISCOVER request that contains preferences and requirements for the desired slice (step 403). This DISCOVER request can include a set of constraints such as:

1. request options and subscribe for authorization (i.e., similar to DHCP IP address allocation) of a set of one or more endpoints;
2. request an application catalog—may be a filtered subset based on business policy—exposed to the user or application;
3. request one or more application slice items from the application catalog;
4. request application slice item(s) with specific values for some or all of the attributes of services in an application slice, such as, for example, a set of MEF Ethernet Virtual Private Lines (EVPLs) and Cloud Computing instances;
5. request subscriber specific prioritization of slice allocation and usage (such as emergency traffic); and
6. request immediate or scheduled start/stop of in-service, although the slice registration server 310 could respond with an alternate start time.

The format of the payload in a DISCOVER request may be a set of name-value pairs for the requests outlined above. The DISCOVER request would be sent upstream from the client 314, as broadcast or unicast packet(s), with one or more intermediate nodes in the path to be RELAY(s) as needed, to be received by the slice registration server 310 of the Service Provider (SP) for the slice. The SP may have previously provided a list of slice registration servers 310 to client 314 from which the client 314 might choose one to establish the session or send a request to each and select the best offer. The list of slice registration servers 310 could be passed down to the client 314 as part of a standard DHCP request for an IP address or during step 401. Additionally, the DHCP server that handles requests for IP addresses could act as a proxy or have the combined behavior of a standard DHCP server and a slice registration server 310, and thus both IP addressing and slice requests could be managed via a single request/response sequence.

The slice registration server 310, on receipt of the DISCOVER request, would analyze available combinations of one or more resource slices to meet the client's slice constraints or catalog requirements (step 404). Based on this analysis, the slice registration server 310 generates a slice OFFER response that includes all application slice constraints or catalog items that the slice registration server 310 can offer to the client 314 as well as the required endpoint identifier(s), e.g., IP address, needed to access some or all application slices in the OFFER as well as other endpoints associated with those slices (step 405). It is possible that the OFFER would fulfill the DISCOVER request based on an existing and available slice, but the slice registration server 310 could also dynamically design a new slice, such as, for example, with Topology and Orchestration Specification for Cloud Applications (TOSCA) Service Templates or another technical implementation choice, to fulfill the DISCOVER request.

The OFFER response generated by the slice registration server 310 is unicast back to the client 314 (step 405). The OFFER response may, based on the slice registration server 310 implementation, include slice specific implementation or abstracted slice details and the associated policies or permissions, e.g., read-only or read-write, to change the state of specific components of the slice. OFFERs can be valid for a specified time (specified in the OFFER). The slice registration server 310 may or may not indicate that the endpoint address space and resource slices for the application slice are reserved at the time of the OFFER. The slice registration server 310 might also probe the network(s) 306 to determine that the previously allocated resource slices as well as the endpoint identifiers are not in use before making the OFFER.

As part of the OFFER, the slice registration server 310 can offer a mix of dedicated and shared resources in a given slice. The resource slices can specify be with specific lease durations, such as, for example, dedicated resource slice components with a longer lease duration while shared resource slice components are with shorter lease durations. Alternatively, the application slice as a whole might be distinguished as premium or standard class of service with different lease durations as determined by commercial models.

When the client 314 receives the OFFER response from the slice registration server 310 it has the option of accepting the response (step 406), in which case the client 314 will send a slice REQUEST to the slice registration server 310 that mirrors the received OFFER or it can ignore the OFFER. It is possible that the client 314 sends slice DISCOVER requests to multiple Service Providers (SPs) and, thus, responses from multiple slice registration servers 310 (one per SP, for example) results in multiple slice OFFERs (e.g., one slice OFFER per SP). It is dependent on the client policies which, if any, of the slice OFFERS are accepted. In some cases, the client 314 may collate information from multiple OFFERs to create an end-to-end slice that is composed of slices from the different SPs. Such collated information may be shared with a master slice registration server 310 or to each of the slice registration servers 310 for operations coordination when necessary.

If a client 314 accepts a slice OFFER, it sends a slice REQUEST to the slice registration server 310 which mirrors the slice OFFER it accepted. The slice registration server 310 will respond with a slice ACK (acknowledgment) and the slice is available for a specified duration. Note, when creating a new slice to meet a DISCOVER request, the slice registration server 310 could leverage automation and SDN technologies to instantiate the new slice (step 408). The slice ACK will indicate that the slice is in an active state (i.e., ready for use by the client 314) or indicate that an additional ACK will be sent within a specified duration indicating that the slice is active. If the first ACK includes a duration, then when that duration expires without the receipt of the second ACK from the slice registration server 310, the client 314 must restart the slice reservation sequence with a new DISCOVER request (step 403).

If a client 314 requires a slice for additional time, the client 314 could re-send a slice REQUEST, i.e., update slice, to the slice registration server 310 before the current duration has expired; typically, for example, halfway through the existing lease duration. If the slice registration server 310 accepts this subsequent REQUEST, it would respond with a slice ACK that contains the new slice lease duration. If the slice REQUEST is not accepted by the slice registration server 310, it can return a NAK or ignore the request. When the client receives a NAK (negative-acknowledgment) or when a resource lease expires, the client 314 would repeat the reservation sequence over, starting from the slice DISCOVER.

The client 314 could also send a RELEASE at any point before the expiration of the lease such as when access to a slice is no longer needed (step 409). This RELEASE can be for some or all of the endpoints (as a list) associated with the slice. When an endpoint is no longer using the application slice, the slice registration server 310 might coordinate with other orchestration/operation systems in the SP network to install an Access Control List (ACL) at an ingress port. The endpoint may continue to be connected to the network for access to other slices or waiting for next time window it needs access to the slice. For example, an IoT endpoint may need to be part of the slice only every x time units to send a burst of data to some IoT server/gateway.

When a slice reservation represents a request for use at a future time, the DISCOVER, OFFER, REQUEST, ACK (DORA) sequence is handled in the same manner as if the slice is not active at the time that the slice registration server 310 sends the ACK. The ACK will contain an indication that the slice will be active in the future and a specified duration for which the slice will be active. For future reservations, this duration represents the time period between the ACK being sent and the start of the reservation. Here, the slice registration server 310 can cause the instantiation at the future time.

At the time the reservation starts, and the slice is active, the slice registration server 310 can send the final ACK to the client 314, indicating to the client 314 that the slice is active and can be used. If the slice reservation becomes invalid before the start of the reservation the slice registration server 310 can send a NAK to the client 314.

If the client 314 has not received an ACK or NAK before the start time of the reservation, the client 314 can resend a REQUEST message identical to the original REQUEST in the initial DORA sequence. The slice registration server 310 will receive this request and if the reservation is still valid and the slice is active, will send an ACK as in the standard DORA sequence.

For a given user/application, each endpoint may separately negotiate its access to a given application slice or one endpoint may be master for some portion of the process. For example, each endpoint may negotiate its endpoint identifier, but one endpoint may negotiate the slice reservation/release on behalf of all endpoints using that application slice. The user/application is then responsible for coordination among its endpoints.

Like DHCP, the slice reservation sequence can employ a "session" or "transaction" ID as part of each request/response to help collate the messages between a user/application and a slice registration server 310. Also, the protocol transport mechanisms may also be encrypted when needed, such as when transiting untrusted networks.

The dynamic reservation process 400 is described with reference to a similar DHCP model. In other embodiments, the dynamic reservation process 400 can operate similarly to other protocol environments, such as Message Queuing Telemetry Transport (MQTT).

Advantageously, the dynamic reservation process 400 is a vendor-neutral protocol which can be used by disparate vendors. The dynamic reservation process 400 allows for multiple implementations that are not dependent on a single vendor. Additionally, because the process 400 builds on the well know DHCP protocol, the dynamic reservation process 400 can be supported by many [most devices] it represents an incremental change on the end devices to support slice reservations.

The dynamic reservation process 400 has a time-based lease duration at its core. This helps the slice registration server 310, similar with DHCP, to manage slice allocation and utilization in an environment, in which clients 314 may come and go and may not always [often] terminate a slice request properly.

The dynamic reservation process 400 enables a paradigm where slices are provisioned and/or sized on demand. The more dynamic the slice instantiation model supported by the slice registration server 310, the better the overall network utilization (at the cost of a more complex slice registration server 310 implementation and operational expense). The dynamic reservation process 400 reduces operational complexity.

Slice Registration Server Process

FIG. 6 is a flowchart of a process 450, implemented by a slice registration server 310, for dynamic reservation of network slices. The process 450 includes receiving a first request from a client 314 for a network slice including one or more of transport, compute, and storage resources in one or more networks for a time period (step 451); determining availability of the network resources based on the first request and a state of the one or more networks (step 452); transmitting a response to the client based on the availability (step 453); receiving a second request from the client based on the response (step 454); and causing instantiation of the resources based on the second request and providing an acknowledgment to the client based thereon (step 455).

The process 450 can further include receiving a release from the client for the network slice and causing the release of the network resources based thereon. The process 450 can further include maintaining network configuration and/or connectivity to the client subsequent to the release for future requests. The process 450 can further include responsive to a failure to cause the instantiation, transmitting a negative acknowledgment to the client; and receiving the first request again based on the negative acknowledgment. The process 450 can further include receiving a third request while the network resources are instantiated to extend the time period; and extending the instantiation of the network resources based thereon.

The first request can include a discover request with a set of name-value pairs, requesting one or more of specific resources, an application catalog of resources, attributes for the specific resources, prioritization, and the time period. The second request can include a mirror of the response. The instantiation of the network resources can be via Software Defined Networking (SDN). The time period can be for a future time and the causing instantiation is scheduled for the future time.

In another embodiment, a slice registration server 310 configured to implement dynamic reservation of network slices includes a network interface 206 communicatively coupled to a client and to one or more networks configured to provide transport, compute, and storage resources; a processor 202 communicatively coupled to the network interface 206; and memory 210 storing instructions that, when executed, cause the processor 202 to receive a first request from the client for a network slice including one or more of transport, compute, and storage resources in the one or more networks for a time period, determine availability of the resources based on the first request and a state of the one or more networks, transmit a response to the client based on the availability, receive a second request from the client based on the response, and cause instantiation of the resources in the one or more networks and provide an acknowledgment to the client based thereon.

In a further embodiment, a non-transitory computer-readable medium includes instructions that, when executed, cause a slice reservation server communicatively coupled to a client and one or more networks configured to provide transport, compute, and storage resources to perform the steps of receiving a first request from the client for a network slice including one or more of transport, compute, and storage resources in the one or more networks for a time period; determining availability of the resources based on the first request and a state of the one or more networks; transmitting a response to the client based on the availability; receiving a second request from the client based on the response; and causing instantiation of the resources and providing an acknowledgment to the client based thereon.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A dynamic registration system comprising:
a slice registration server communicatively coupled to one or more clients, and to one or more Application Programming Interfaces (APIs), wherein each API is communicatively coupled to an associated network of a plurality of networks, each network having resources including one or more of transport, compute, and storage resources;
wherein the slice registration system includes one or more processors configured to
receive one or more requests for resources of the one or more of transport, compute, and storage resources in the plurality of networks, for a client,
exchange request/response messages using the one or more APIs with the plurality of networks for a slice registration of the resources in the plurality of networks and with the client, wherein the client is configured to provide a mirror of an offer, including specifying one or more of dedicated resources and shared resources, for selection thereof or to ignore the offer,
cause instantiation of the resources in the plurality of networks, based on the request/response messages, and
provide an acknowledgment to the client based on the instantiation of the resources.

2. The dynamic registration system of claim 1, wherein the slice registration server is a master and the dynamic registration system further comprising one or more additional slice registration servers between the plurality of networks and the master.

3. The dynamic registration system of claim 1, wherein the slice registration is any of on-demand and scheduled for a future time.

4. The dynamic registration system of claim 1, wherein the clients include any of user devices, network operators, Internet of Things (IoT) devices, and groups of devices.

5. The dynamic registration system of claim 1, wherein the slice registration is for different types of resources across at least two different networks of the plurality of networks.

6. The dynamic registration system of claim 1, wherein the request/response messages utilize the Dynamic Host Configuration Protocol (DHCP) protocol.

7. The dynamic registration system of claim 1, wherein the request/response messages further provide Internet Protocol (IP) addressing.

8. A non-transitory computer-readable medium comprising instructions that, when executed, cause a slice registration server to perform the steps of:
receiving one or more requests for resources of one or more of transport, compute, and storage resources in a plurality of networks, for a client, wherein the slice registration server is communicatively coupled to one or more clients, and to one or more Application Programming Interfaces (APIs), wherein each API is communicatively coupled to an associated network of the plurality of networks, each network having resources including one or more of transport, compute, and storage resources,
exchanging request/response messages using the one or more APIs with the plurality of networks for a slice registration of the resources in the plurality of networks and with the client, wherein the client is configured to provide a mirror of an offer, including specifying one or more of dedicated resources and shared resources, for selection thereof or to ignore the offer,
causing instantiation of the resources in the plurality of networks, based on the request/response messages, and
providing an acknowledgment to the client based on the instantiation of the resources.

9. The non-transitory computer-readable medium of claim 8, wherein the slice registration server is a master and wherein one or more additional slice registration servers are between the plurality of networks and the master.

10. The non-transitory computer-readable medium of claim 8, wherein the slice registration is any of on-demand and scheduled for a future time.

11. The non-transitory computer-readable medium of claim 8, wherein the clients include any of user devices, network operators, Internet of Things (IoT) devices, and groups of devices.

12. The non-transitory computer-readable medium of claim 8, wherein the slice registration is for different types of resources across at least two different networks of the plurality of networks.

13. The non-transitory computer-readable medium of claim 8, wherein the request/response messages utilize the Dynamic Host Configuration Protocol (DHCP) protocol.

14. The non-transitory computer-readable medium of claim 8, wherein the request/response messages further provide Internet Protocol (IP) addressing.

15. A method comprising:
at a slice registration server, receiving one or more requests for resources of one or more of transport, compute, and storage resources in a plurality of networks, for a client, wherein the slice registration server is communicatively coupled to one or more clients, and to one or more Application Programming Interfaces (APIs), wherein each API is communicatively coupled to an associated network of the plurality of networks, each network having resources including one or more of transport, compute, and storage resources, exchanging request/response messages using the one or more APIs with the plurality of networks for a slice registration of the resources in the plurality of networks and with the client, wherein the client is configured to provide a mirror of an offer, including specifying one or more of dedicated resources and shared resources, for selection thereof or to ignore the offer, causing instantiation of the resources in the plurality of networks, based on the request/response messages, and providing an acknowledgment to the client based on the instantiation of the resources.

16. The method of claim 15, wherein the request/response messages utilize the Dynamic Host Configuration Protocol (DHCP) protocol.

17. The method of claim 15, wherein the request/response messages further provide Internet Protocol (IP) addressing.

\* \* \* \* \*